United States Patent [19]

Hoene et al.

[11] 4,164,613
[45] Aug. 14, 1979

[54] MANUFACTURE OF POLYMERS IN BEAD FORM FROM WATER-SOLUBLE, ETHYLENICALLY UNSATURATED MONOMERS

[75] Inventors: Richard Hoene, Heidelberg; Dietmar Jung, Ludwigshafen; Hans-Uwe Schenck, Wachenheim; Herbert Spoor, Limburgerhof, all of Fed. Rep. of Germany

[73] Assignee: BASF Aktiengesellschaft, Fed. Rep. of Germany

[21] Appl. No.: 817,254

[22] Filed: Jul. 20, 1977

[30] Foreign Application Priority Data

Mar. 10, 1977 [DE] Fed. Rep. of Germany ....... 2710372

[51] Int. Cl.$^2$ ............................ C08F 2/16; C08F 2/32
[52] U.S. Cl. .................................. 526/201; 526/203; 526/207; 526/303; 526/312
[58] Field of Search ....................... 526/201, 202, 203

[56] References Cited

U.S. PATENT DOCUMENTS

| 3,255,127 | 6/1966 | von Bonin | 526/203 X |
| 3,729,451 | 4/1973 | Blecke | 526/203 |
| 3,948,866 | 4/1976 | Pennewiss | 260/79.3 MU |

Primary Examiner—C. A. Henderson, Jr.
Attorney, Agent, or Firm—Keil & Witherspoon

[57] ABSTRACT

Production of polymers in bead form by forming a water-in-oil suspension of an aqueous solution containing at least one water-soluble ethylenically unsaturated monomer in an inert hydrophobic liquid organic dispersion medium and polymerizing the suspended monomer in the presence of a polymerization initiator and a protective colloid obtained by polymerizing (A) 60 to 100% by weight of at least one monomer selected from the group consisting of cyclopentadiene, dicyclopentadiene, tricyclopentadiene and alkyl-substituted derivatives thereof, and (B) 0 to 40% by weight, based on the mixture of (A) and (B), of a mono- or diethylenically unsaturated monomer copolymerizable with (A).

3 Claims, No Drawings

MANUFACTURE OF POLYMERS IN BEAD FORM FROM WATER-SOLUBLE, ETHYLENICALLY UNSATURATED MONOMERS

BACKGROUND OF THE INVENTION

The present invention relates to a process for the manufacture of polymers is bead form from water-soluble, ethylenically unsaturated monomers by the inverse suspension polymerization process, in which an aqueous solution of the monomers is suspended in an inert hydrophobic liquid and polymerized therein, in the presence of a polymerization initiator and a protective colloid, to give polymeric products in bead form.

This process for the manufacture of polymers in bead form from water-soluble, ethylenically unsaturated monomers is disclosed in German Pat. No. 1,081,228. For the purpose of carrying out the process in practice, the correct choice of a suitable protective colloid is critical. The protective colloids stabilize the water-in-oil emulsions and influence the size of the polymer beads. Examples of protective colloids employed are sorbitan esters, eg. sorbitan monostearate and sorbitan monooleate, ethoxylated fatty acid amides, fatty acid esters of glycerol, sorbitan sesquioleate and sorbitan monooleate together with dicalcium phosphate or hydroxyapatite or silicates. A further group of conventional protective colloids comprises block polymers or graft polymers which contain at least one polymeric hydrophilic portion and one polymeric hydrophobic portion in the molecule. The process of inverse suspension polymerization permits the manufacture of polymers of particularly high molecular weights and further provides the possibility of removing the water directly by azeotropic distillation from the system, given a suitable choice of the auxiliary phase.

During the polymerization, the aqueous phase of the water-in-oil dispersion passes through a very tacky state. Even after completion of the polymerization, the suspended water-containing polymer is not non-tacky. Hence, polymer particles can stick to one another and to the walls of the vessel during the polymerization or during azeotropic dehydration following the polymerization. In extreme cases this phenomenon can reach such proportions that the entire polymer sticks together in one coherent mass which clings to the stirrer and the walls. The conventional protective colloids have the disadvantage that they do not prevent the build-up of deposits on the walls of the polymerization apparatus and on the stirrer.

It is an object of the invention to provide protective colloids for the initially described inverse suspension polymerization process, by means of which the disadvantages of the conventional protective colloids are very substantially avoided.

SUMMARY OF THE INVENTION

We have found that the above object is achieved by using, as protective colloids, polymers of
(A) from 60 to 100 percent by weight of cyclopentadiene, dicyclopentadiene, tricyclopentadiene and/or their alkyl-substituted derivatives and
(B) from 0 to 40 percent by weight, based on the mixture of (A) and (B), of copolymerizable monoolefinically or diolefinically unsaturated monomers.

DETAILED DESCRIPTION OF THE INVENTION

The inert hydrophobic liquid which constitutes the auxiliary phase of the water-in-oil suspension can in principle be any water-immiscilbe liquid which does not interfere with the polymerization. The use of aliphatic, cycloaliphatic and aromatic hydrocarbons or hydrocarbon mixtures is preferred.

According to the invention, all water-soluble monomers can be polymerized by the inverse suspension polymerization process to give polymers in bead form. This process is above all of importance for polymerizing amides of ethylenically unsaturated carboxylic acids of 3 to 4 carbon atoms, eg. acrylamide and methacrylamide, and for the manufacture of copolymers of the said amides with other ethylenically unsaturated water-soluble monomers, eg. acrylic acid, methacrylic acid, their lithium, sodium, potassium and ammonium salts and other ethylenically unsaturated carboxylic acids and their salts, which are copolymerizable with the amides, substituted acrylamides, eg. N-methylolacrylamide and N-methylolmethacrylamide, basic esters of carboxylic acids of 3 or 4 carbon atoms, eg. diethylaminoethyl acrylate and dimethylaminoethyl methacrylate, and the corresponding carboxylic acid amides, eg. diethylaminoethylacrylamide and dimethylaminoethylmethacrylamide.

It is also possible to employ several of the said monomers in the polymerization. It is also possible to employ minor amounts of monomers which are less readily water-soluble but which, on the other hand, dissolve in the auxiliary phase. However, it is a precondition for this that these monomers should copolymerize readily with the above water-soluble monomers; examples of suitable monomers are acrylonitrile and methyl acrylate. The only slightly water-soluble monomers are employed in an amount of up to 20 percent by weight, based on the total monomer mixture. The polymerization is carried out be suspending an aqueous solution of one or more monomers in an inert hydrophobic liquid so as to form a water-in-oil suspension. However, this requires the presence of a protective colloid.

According to the invention, the protective colloids employed are reaction products which are manufactured in the conventional manner by a free-radical initiator-assisted or thermal solution polymerization or mass polymerization of
(A) from 60 to 100 percent by weight of cyclopentadiene, dicyclopentadiene, tricyclopentadiene and/or their alkyl derivatives and
(B) from 0 to 40 percent by weight, based on the mixture of (A) and (B), of copolymerizable monoolefinically or diolefinically unsaturated monomers. To display their activity as protective colloids, the products must be soluble in the inert hydrophobic liquid. However, small proportions of insoluble material do not interfere.

The protective colloids to be employed according to the invention are either homopolymers or copolymers of the monomers of group (A), i.e., of cyclopentadiene, dicyclopentadiene or tricyclopentadiene. These monomers may or may not be alkyl-substituted, eg. with from 1 to 3 alkyl substituents, which substituents are each of 1 to 10 carbon atoms. Cyclopentadiene is obtained, for example, on thermal decomposition of naphtha, in the $C_5$-fraction; dicyclopentadiene and tricyclopentadiene are oligomers which would thus not be present initially in a C₅ fraction. Fractionation makes it possible to obtain purified mixtures which may or may not be oligomerized and which as a rule contain from about 0.1 to 5 per cent by weight of other saturated or unsaturated hydrocarbons, eg. pentane, isoprene, piperylene or codimers of cyclopentadiene with conjugated diolefins or other Diels-Alder reaction products of the monomers mentioned under (A).

Preferably, purified dicyclopentadienes are used as component (A) of the homopolymers or copolymers. The monomers of group (A) account for from 60 to 100 percent by weight of the structure of the polymers.

The components B used are monoolefinically or diolefinically unsaturated monomers which are copolymerizable with the monomers of group (A). This class of monomer includes, for example, maleic anhydride, maleic acid and maleic acid monoalkyl esters where alkyl is of 1 to 18 carbon atoms, ethylenically unsaturated monocarboxylic acids or dicarboxylic acids of 3 to 5 carbon atoms, eg. acrylic acid, methacrylic acid, fumaric acid and itaconic acid, esters of the said ethylenically unsaturated carboxylic acids with monohydric alcohols of 1 to 12 carbon atoms, allyl alcohol, isoprene, piperylene and butadiene and monoamides of the said dicarboxylic acids; either ammonia or primary amines of 1 to 20 carbon atoms and secondary amines of 2 to 20 carbon atoms may be used to form the monoamides. In addition, the copolymers may contain styrene, methylstyrene and other vinyl-aromatics as component (B). The monomers of group (A) may be employed alone or as mixtures with monomers of group (B) to manufacture the polymers. The monomers of group (B) account for up to 40 percent by weight of the structure of the copolymers. The use of terpolymers which contain dicyclopentadiene as component (A) and maleic anhydride or maleic acid monoesters of alcohols of 1 to 18 carbon atoms and styrene or substituted styrenes as component (B) is preferred. Since these protective colloids must be substantially soluble in the inert hydrophobic liquid, preferably consisting of hydrocarbons, which serves as the auxiliary phase of the inverse suspension polymerization, it is not possible to use any monomer B or any monomer combination (B) up to a content of 40%; instead, it is only possible to the extent that it ensures that the copolymer remains soluble.

The polymers used as protective colloids are as a rule manufactured at from 200° C. to 300° C. under pressures of up to 50 bars. The temperatures during manufacture of the polymer are preferably from 250° to 300° C. and the pressures from 3 to 30 bars. If, for example, styrene and maleic anhydride are used as component (B), it is advantageous to use only a short heating-up time, eg. less than 2 hours, of the monomers during the polymerization. The reaction times are from a few minutes to several hours. Below 200°, the formation of insoluble cyclopentadiene oligomers is to be expected; above 300°, the products may become insoluble as a result of cross-linking side-reactions. It is advantageous, but not absolutely essential, to carry out the polymerization under an inert gas. As a rule, the reaction can be carried out as a purely thermal polymerization, for example in accordance with the process described in Ind. Eng. Chem. 30 (1938), 245–251.

Though the polymerization can also be carried out without addition of initiators, the use of compounds which form free radicals may in individual cases be of advantage, examples of such compounds being peroxides, eg. di-t-butyl peroxide, and hydroperoxides, eg. cumene hydroperoxide, diacyl peroxides, eg. dibenzoyl peroxide, per-esters, eg. t-butyl perbenzoate, azo compounds, eg. azodiisobutyronitrile, and compounds with a labile carbon-carbon bond.

Even though the polymerization can also be carried out without solvents, solvent polymerization is in most cases more advantageous. Suitable solvents are aromatic hydrocarbons, eg. benzene, toluene, xylene, ethylbenzene and gasoline fractions rich in aromatics; aliphatics, eg. gasoline, hexane and heptane; cycloaliphatics, eg. cyclohexane; saturated and unsaturated aliphatic hydrocarbons which may arise as concomitant products in the course of the isolation of cyclopentadiene or dicyclopentadiene; and ethers, esters or ketones, provided they are substantially inert under the reaction conditions. The solvents may be used individually or as mixtures.

Though as a rule it is not necessary, the presence of further additives may in specific cases be advantageous; depending on the desired effect, small amounts of such additives are admixed to the products before, during or after the polymerization. Examples of such additives are extenders, flow control agents and plasticizers, eg. oils, waxes, resins, paraffins and dibutyl phthalate, or stabilizers, eg. hydroquinone and p-t-butylcresol. It is also possible slightly to modify the polymers in the conventional manner by reactions of the polymers corresponding to the reactions which their monomers can undergo, or grafting reactions. For example, instead of copolymerizing maleic acid monoesters or monoamides as component (B), it is possible to manufacture a polymer with maleic anhydride and then to react it with alcohols or amines to give the monoamides or monoesters. Reactants which may be used for other modifications include isocyanates, N-methylol compounds, phenols, phenolic resins, olefinically unsaturated compounds, eg. natural oils and compounds which undergo ene reactions.

The polymers as a rule have softening points of from 100° 250° C., iodine numbers of from 30 to 200 and molecular weights of from 400 to 5,000, preferably of from 600 to 1,500.

The protective colloids are employed in an amount of from 0.01 to 4 percent by weight, based on the oil phase of the water-in-oil suspension. The proportion of the inert hydrophobic liquid in the water-in-oil suspension is from 40 to 90 percent by weight.

The monomer concentration in the aqueous monomer solution can be varied within wide limits and is in general from 15 to 80%. The upper limit is above all determined by the solubility of the monomers whilst the lower limit is as a rule imposed by economic considerations.

The conventional free radical polymerization initiators, eg. peroxides, hydroperoxides and azo compounds, are employed, in the conventional amounts, for the polymerization of the monomers.

The polymers are obtained in the form of beads which, on azeotropic removal of the water, are in the form of dry products. Polymers in bead form are, for the purpose of the invention, to be understood also to include those wherein the particles, of from 0.2 to 5 mm in size, consist of several smaller intergrown particles. The advantage of the process according to the invention is above all that only extremely little deposit, if any, is formed on the polymerization apparatus and equipment. A further advantage is that as a result of the use of the protective colloids, the particle size distribution of the polymer can be influenced more effectively than is feasible when using the conventional protective colloids.

The examples which follow illustrate the process of the invention. The percentages referred to in the Examples and the parts referred to below are by weight. The number-average molecular weights of the protective colloids were measured by vapor pressure osmometry in benzene at various concentrations and extrapolated to 0, the softening points were determined by the method of DIN 53,180 and the iodine numbers were determined by hydrogenating the protective colloid in tetrahydrofuran for 2 hours, over a Pt catalyst.

MANUFACTURE OF THE PROTECTIVE COLLOIDS

Protective colloid A 152 kg of dicyclopentadiene (>85% pure), 8 kg of maleic anhydride and 10 kg of styrene are introduced into a 500 l pressure vessel equipped with a stirrer and are thoroughly flushed with nitrogen. The reaction mixture is heated to 267° C. over 1 hour, generating an internal pressure of about 7 bars, and is kept at this temperature for 60 minutes.

The mixture is then cooled to 230° C. and the volatile constituents are distilled off. A pale resin having a molecular weight of 900, a softening point of 197° C. and an iodine number of 70, is obtained.

Protective colloids B to G were manufactured in accordance with the same instructions, but in a 40 liter stirrer kettle and using the starting materials and amounts specified in each case.

Protective colloid B 11.4 kg of a commerical dicyclopentadiene (>96% pure) and 0.75 kg of styrene are reacted in 3.75 kg of xylene at 289° C. over 2 hours. A polymer having a molecular weight of 1,200 and an iodine number of 56 is obtained.

Protective colloid C 11.4 kg of a commercial dicyclopentadiene (>96% pure) are polymerized in 3.75 kg of xylene at 280° C. over 2 hours. A polymer having a molecular weight of 1,040 and an iodine number of 98 is obtained.

Protective colloid D 11.4 kg of dicyclopentadiene (96% pure) and 0.6 kg of maleic anhydride are copolymerized in 3.75 kg of xylene as the solvent at 280° C. over 2 hours. A polymer having a molecular weight of 950 and an iodine number of 51 is obtained.

Protective colloid E 14.9 kg of dicyclopentadiene (96% pure) and 1.12 kg of maleic anhydride are copolymerized in 1 kg of cyclohexane at 285° C. over 1 hour. The copolymer has a molecular weight of 1,050 and an iodine number of 103.

Protective colloid F 11.4 kg of a commerical dicyclopentadiene (>96% pure), 0.75 kg of styrene and 0.6 kg of maleic anhydride in a mixture of 3.75 kg of xylene and 0.5 kg of n-butanol are heated to 285° C. over 30 minutes and copolymerized at this temperature for 45 minutes. The copolymer has a molecular weight of 900 and an iodine number of 94.

Protective colloid G 6.9 kg of a commerical dicyclopentadiene (93% pure), 0.6 kg of maleic anhydride and 5.25 kg of styrene in 3.75 kg of xylene are heated to 285° C. over 90 minutes and copolymerized at this temperature for 1 hour. The copolymer has a molecular weight of 910 and an iodine number of 94.

EXAMPLE 1

2 g of protective colloid A, 1.60 liters of cyclohexane and 30.0 g of water were introduced into a 5 liter kettle equipped with heating, an impeller stirrer, a thermometer, a reflux condenser and a dropping funnel. After flushing the kettle with nitrogen, the materials which had been introduced were heated whilst stirring and the pressure in the kettle was reduced to cause the contents to boil under reflux at 50° C. 92 g of acrylamide, 40 g of acrylic acid and 140 mg of sodium hexametaphosphate were then dissolved in 216 g of water and the pH was brought to 7 with 41 g of 50% strength sodium hydroxide solution. 13.5 ml of a 10% strength aqueous ammonia solution and 4.4 ml of a 1% strength aqueous potassium peroxydisulfate solution were added to the above solution and the dissolved oxygen was removed by means of a stream of nitrogen, whilst running the mixture, over half an hour, into the boiling material in the kettle, with the stirrer running at 300 rpm. Polymerization was continued for a further hour, 8.0 ml of a 1% strength aqueous hydroxylammonium sulfate solution were added and the water was removed by azeotropic distillation under atmospheric pressure. The anhydrous suspension was run out and the kettle was flushed with cyclohexane. It was virtually free from deposit. The polymer was filtered off and dried under reduced pressure. Round beads of from 0.1 to 0.75 mm diameter were obtained.

EXAMPLE 2

Example 1 was repeated except that the amount of the protective colloid employed was increased to 5 g. The deposit remaining in the kettle weighed 2 g. The product consisted of round beads of from 0.1 to 0.75 mm diameter.

EXAMPLE 3

Example 1 was repeated except that instead of the protective colloid A, 5.0 g of protective colloid B were used. The deposit remaining in the kettle weighed 1 g. The product consisted of beads of from 0.75 to 3 mm diameter.

EXAMPLE 4

Example 1 was repeated with 5 g of protective colloid C. Round beads of from 0.3 to 1 mm diameter were obtained. The kettle was virtually free from deposit.

EXAMPLE 5

Example 1 was repeated with 5.0 g of protective colloid D. Round beads of from 0.2 to 2 mm diameter were obtained. The kettle was virtually free from deposit.

EXAMPLE 6

Using an initial charge of 1.5 g of protective colloid E, 30.0 ml of water and 1.60 l of cyclohexane, and a monomer solution consisting of 246 g of water, 120.5 g of acrylamide, 90 mg of sodium hexametaphosphate and 17.5 ml of a 10% strength aqueous ammonia solution to which 7.5 ml of a 1% strength aqueous potassium peroxydisulfate solution had been added, the polymerization was carried out over 0.75 hour at 65° C., in the manner described in Example 1. Round beads of from 0.2 to 1.5 mm diameter were obtained. 1.7 g of polymer remained as a deposit on the walls of the kettle.

EXAMPLE 7

Example 6 was repeated with 2.0 g of protective colloid F. Round beads of from 0.1 to 0.75 mm diameter were obtained. A deposit of 1.8 g remained in the kettle.

EXAMPLE 8

Using an initial charge of 2.0 g of protective colloid A, 30 ml of water and 1.60 l of cyclohexane, and a monomer solution consisting of 376 g of water, 113 g of acrylamide, 131 g of diethylaminoethyl acrylate, 200 mg of formic acid and 100 g of 37.5% strength sulfuric acid to which 28 ml of a 2% strength potassium peroxydisulfate solution had been added, the polymerization was carried out over one hour at 60° C., in the manner described in Example 1. Round beads of from 0.5 to 2 mm diameter were obtained. The kettle was free from polymer deposits.

EXAMPLE 9

Example 1 was repeated with 5 g of protective colloid G. Round beads of from 1 to 3 mm in size were obtained. 1.5 g of polymer remained as a deposit in the kettle.

COMPARATIVE EXAMPLE

Example 1 was repeated except that instead of protective colloid A, the same amount of sorbitan monostearate was used. Polymer beads of from 0.2 to 1.5 mm diameter were obtained. 47 g of polymer adhered firmly as a deposit to the stirrer and the walls of the kettle.

COMPARATIVE EXAMPLE 2

Example 1 was repeated except that instead of protective colloid A, the same amount of an oil-soluble ethylcellulose was used. Beads of from 0.1 to 2 mm diameter were obtained. 33 g of polymer remained as a deposit in the kettle.

COMPARATIVE EXAMPLE 3

Example 2 was repeated except that instead of protective colloid A, a product manufactured as described in Example A of German Laid-Open Application DOS 2,009,218 was employed. Beads of from 0.1 to 0.75 mm diameter were obtained. 17 g of polymer remained as a deposit adhering firmly to the wall of the kettle.

We claim:

1. In a process for the production of polymers, in bead form, of water-soluble ethylenically unsaturated monomers by forming a water-in-oil suspension of an aqueous solution containing at least one water-soluble ethylenically unsaturated monomer in an inert hydrophobic liquid organic dispersion medium and polymerizing the suspended monomer in the presence of a protective colloid and a polymerization initiator, the improvement which comprises using as a protective colloid a polymer obtained by polymerizing a mixture of
    (A) 60 to 99.9% by weight of dicyclopentadiene, and
    (B) 0 to 30% by weight of styrene and 0.1 to 10% by weight of maleic anhydride, said protective colloid polymer being soluble in the inert hydrophobic liquid organic dispersion medium, said protective colloid polymer further having a number-average molecular weight of from 400 to 5,000 and an iodine number of from 30 to 200.

2. In a process for the production of polymers, in bead form, of water-soluble ethylenically unsaturated monomers by forming a water-in-oil suspension of an aqueous solution containing at least one water-soluble ethylenically unsaturated monomer in an inert hydrophobic liquid organic dispersion medium and polymerizing the suspended monomer in the presence of a protective colloid and a polymerization initiator, the improvement which comprises using as a protective colloid a homopolymer of dicyclopentadiene, said protective colloid polymer being soluble in the inert hydrophobic liquid organic dispersion medium, said protective colloid polymer further having a number-average molecular weight of from 400 to 5,000 and an iodine number of from 30 to 200.

3. A process as set forth in claim 1, wherein the protective colloid polymer is a copolymer of dicyclopentadiene and 0.1 to 10% by weight of maleic anhydride.

* * * * *